COMMUNICATION TRANSPONDER TECHNIQUE

Filed Feb. 3, 1965 3 Sheets-Sheet 1

INVENTORS
ROSS BATEMAN &
JAMES D. AHLGREN
BY Hurvitz & Rose
ATTORNEYS

Dec. 30, 1969 R. BATEMAN ET AL 3,487,310

COMMUNICATION TRANSPONDER TECHNIQUE

Filed Feb. 3, 1965 3 Sheets-Sheet 2

INVENTORS
ROSS BATEMAN &
JAMES D. AHLGREN

BY Hurvitz & Rose

ATTORNEYS

INVENTORS
ROSS BATEMAN &
JAMES D. AHLGREN
BY: Hurvitz & Rose
ATTORNEYS

United States Patent Office 3,487,310

Patented Dec. 30, 1969

3,487,310

COMMUNICATION TRANSPONDER TECHNIQUE

Ross Bateman, McLean, and James D. Ahlgren, Herndon, Va., assignors to Page Communications Engineers, Inc., Washington, D.C., a corporation of Delaware Filed Feb. 3, 1965, Ser. No. 430,007
Int. Cl. H04b 7/14, 1/40
U.S. Cl. 325—5 16 Claims

ABSTRACT OF THE DISCLOSURE

A repeater is provided with means for sequentially and successively switching filters tuned to frequencies $f_1$ and $f_2$, each between an input circuit and an output circuit of a balanced modulator in alternation. A local oscillator generates a wave at frequency $f_1$–$f_2$, which wave is applied to the local oscillator whereby signals received from a transceiver at frequency $f_1$ are transmitted at frequency $f_2$ and vice versa. If the repeater is operated with more than two transceivers, the repeater employs three filters with one filter in the input circuit and two filters in the output circuit of the modulator at any one time. Sequential and successive alternation of filters between said circuits permits multifrequency operation.

The present invention relates generally to communication systems, and more particularly to communication systems involving a two way repeater capable of coupling two or more transceivers operating on different frequencies, wherein the repeater operates to repeat signals from the transceivers on a time sharing basis, while the transceivers can operate continuously and on an unsynchronized basis.

Briefly describing a preferred embodiment of the invention, a first transceiver receives and transmits on a carrier frequency $f_1$, while a second transceiver receives and transmits on a carrier frequency $f_2$, the transceivers being coupled by a repeater which on reception of a carrier signal of frequency $f_1$ converts that carrier signal to a carrier signal of frequency $f_2$, and transmits the latter, and which on reception of a carrier signal of frequency $f_2$ converts that carrier frequency to a carrier frequency of frequency $f_1$ and transmits the latter. The repeater is, on a time sharing basis, receptive to carrier frequencies $f_1$ and $f_2$ in succession. Thereby, the transceivers can be capable of transmitting continuously and of receiving continuously, the repeater intercoupling the two in opposite directions in alternation, on an unsynchronized basis.

The described operation implies maximum simplicity for the transceivers and the repeater, since the latter requires only one antenna, which transmits on one frequency while receiving another, and the transceivers can operate each on a single frequency, and require no synchronizing apparatus.

The principles of the repeater above briefly described may be extended to operate with transceivers which can individually receive and transmit on distinct frequencies, provided these are properly chosen, and to systems involving more than two transceivers operating with a single repeater on more than two frequencies, although in such case the repeater is subject to certain modifications within the concepts of the system.

More fully describing the present invention, transmission between plural transceivers, each of which transmits and receives on one carrier frequency, different carriers being provided for distinct transceivers, is established via a transponder utilizing time sharing or time division multiplex techniques, coupled with frequency sharing techniques. Frequency displacement is accomplished to at least twice the maximum modulation frequency impressed on the carrier so that a substantial replica of each transmitted signal is derived at each receiver.

The transponder includes bandpass filters and frequency converters for its carriers, connected so that its transmitted energy is always removed in frequency from its received energy and singing or oscillation is prevented.

In the several embodiments of the invention, a bandpass filter is provided for each carrier handled by the transponder. The filters are connected together via frequency converter means that is capable of changing each input frequency into an output frequency commensurate with the carrier of the other transceiver. In each mode of connection, there are two bandpass filters connected between the transponder input and output terminals, one on the input side of the converter means for selecting the input frequency and another on the output side of the converter means for selecting the output frequency. If the received frequency is not passed through the filter on the input side, the converter means and filters are connected so that virtually no signal is passed through the filter on the output side. Thus, any signal outside the band of interest is attenuated by a pair of cascaded rejection devices to insure exclusion of transmission on an undesired frequency.

It is, accordingly, an object of the present invention to provide a new and improved transponder for coupling signals between transceivers which are individually adapted to operate on a single carrier frequency only, the carrier frequencies of the different transceivers being separated.

A further object of the invention is to provide a transponder for establishing communication on a time division multiplex basis between plural transceivers, each of which has a single operating carrier frequency for receiving and transmitting, a different carrier frequency being employed by each transceiver.

It is still another object of the invention to provide a novel unsynchronized two way multiplex transponder system, in which time division multiplexing occurs only at a repeater station and not at the terminal stations of the system, in which the transponder transmits and receives on different frequencies to and from transceivers which themselves employ diverse carrier frequencies.

A further object of the invention resides in the provision of a two way multiplex transponder system involving three transceivers, in which each transceiver transmits to the remaining two, the transceiver transmissions being repeated in sequence, on a time sharing basis.

Another object of the invention is to provide a repeater capable of simultaneous and continuous reception of two or more signals on different frequencies, and to transmission on the same frequencies in a sequenced pattern, without singing, the repeater requiring only one antenna for all reception and transmission requirements.

A further object of the invention relates to the provision of a repeater for plural signals on different carrier frequencies, which employs only one filter per carrier frequency, employing the filters one at a time on a sequential basis in a receiving opertaion, the remaining filters being always totally employed for selecting transmission frequencies, and radiating the instantaneously transmitted frequencies on the same antenna which is then effecting reception of the received frequency.

The above and still further objects, features and advantages of the present invention will become apparent upon consideration of the following detailed description of several specific embodiments thereof, especially when taken in conjunction with the accompanying drawings, wherein.

Figures 1, 4:
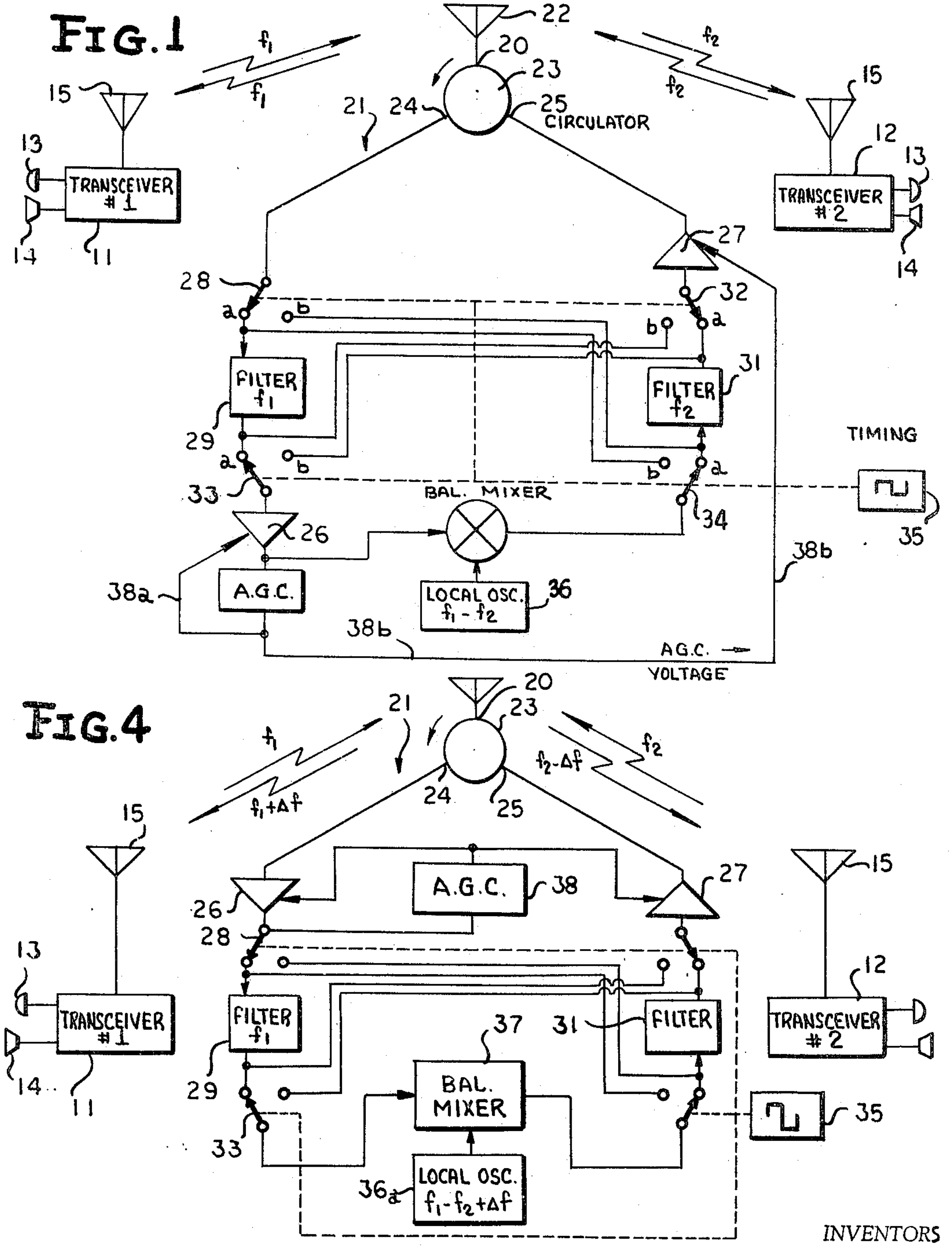
FIGURE 1 is a block diagram of a preferred embodiment of the present invention wherein transmission occurs between a pair of transceivers via a transponder.
FIGURE 4 is a block diagram of the invention generally corresponding with FIGURE 1 in which each transceiver utilizes a different frequency for reception and transmission.

Reference is now made to FIGURE 1 wherein there are illustrated remotely located transceivers 11 and 12 for transmitting and receiving relatively displaced carrier frequencies $f_1$ and $f_2$, respectively. Each transceiver includes microphone 13 and loudspeaker 14 for transducing between voice and electric signals. Carrier frequencies $f_1$ and $f_2$, transmitted and received by antennae 15 of transceivers 11 and 12, respectively, are preferably in the very high frequency range of 30–300 megacycles, typically separated by a substantially constant factor, which may be on the order of 2 to 20 mc.

The carriers, which may be amplitude, frequency or phase modulated, are coupled between transceivers 11 and 12 via transponder or repeater station 21, capable either of fixed operation preferably at an elevated location, or of being carried on a balloon, aircraft, parachute, earth satellite, or other vehicle. Transponder 21 includes antenna 22, adapted for transducing electromagnetic waves of frequencies $f_1$ and $f_2$. Circulator 23 is arranged to transmit energy from port 20 (connected to antenna 22) to port 24( connected to the input of broadband R.F. amplifier 26 via filter 29), while inhibiting transmission to port 25 (connected to output of broadband R.F. amplifier 27); similarly, it permits transmission of energy applied to port 25 (from amplifier 27) to port 20, while inhibiting its transmission to port 24. If the characteristics of filters 29 and 31 are adequate, the circulator may be omitted. A hybrid network may also be substituted for the circulator 23.

Input signals flow through stepping switch 28 in its *a* position to filter 29. The latter selects the $f_1$ carrier and rejects the $f_2$ carrier. The $f_1$ carrier proceeds via contact *a* of stepping switch 33 to amplifier 26, and the latter supplies the signal to mixer 37. Local oscillator 36 provides heterodyne signal at frequency $f_1$–$f_2$ to mixer 37, which at its output supplies a conversion product at frequency $f_2$. The latter proceeds via contact *a* of switch 34 to filter 31, which excludes or stops all extraneous conversion products. The $f_2$ signal is then conveyed to amplifier 27 via switch 32, contact *a*. Amplifier 27 provides the $f_2$ signal to circulator 23 at port 25, and the circulator 23 conveys the $f_2$ signal to antenna 22, for radiation thereby.

Amplifier 26 also supplies the $f_1$ signal to AGC circuit 38. The latter supplies AGC voltage to amplifier 26, via lead 38*a*, and to amplifier 27 via lead 38*b*, to maintain the gains of the amplifiers at optimum values in relation to incoming signal strength.

Timing source 35 reverses the positions of stepping switches 28, 33, 32, 34 in synchronism, at alternate contacts *a, b*. When the *b* contacts are in circuit signal from port 24 proceeds to the input of filter 31, which selects signal at frequency $f_2$ and rejects signal at frequency $f_1$. The $f_1$ signal then proceeds to switch 33*b*, and via amplifier 26 to converter 37. The latter now converts $f_2$ to $f_1$, and passes $f_1$ via switch 34, contact *b* to the input of filter 29. The latter selects frequency $f_1$ and rejects extraneous conversion products, and supplies $f_1$ to amplifier 27 via switch 32, contact *b*. Circulator 23 conveys the $f_1$ signal to antenna 22, for radiation thereby.

Connections between amplifiers 26, 27, as well as between filters 29 and 31, are periodically reversed at a rate in excess of twice the highest modulation frequency on $f_1$ and $f_2$ by synchronous switches 28, 32, 33 and 34 that are controlled by switching rate generator 35. While switches 28 and 32–34 have been illustrated as being of the electro-mechanical type for simplicity, it is understood that in practice they are perferably electronic. If carriers $f_1$ and $f_2$ are amplitude modulated by voice intelligence having a maximum 5 kc. spectrum, the frequency of oscillator 35 is generally in the neighborhood of 12 kc. or higher.

When oscillator 35 is deriving a positive voltage, switches 28 and 32–34 are in the position illustrated in the accompanying drawings, whereby the signal input to amplifier 26 is coupled through filter 29. The output signal of amplifier 26 is fed to balanced modulator 37, which is responsive to local oscillator 36, having an output frequency ($f_1$–$f_2$) equal to the difference between the carrier frequencies associated with transceivers 11 and 12. The sum and difference frequencies deriving from mixer 37 are applied to amplifier 27 via switches 32, 34 and filter 31. When the voltage of oscillator 35 goes negative, switches 28 and 32–34 are reversed, so that the input to amplifier 26 is now applied via filter 32. Mixer 37 sum and difference output frequencies are applied via switch 34 to filter 29, from which is derived a signal to feed amplifier 27 via switch 32.

When the system is designed to operate with amplitude modulated carriers, or other modulation techniques requiring linear amplification, automatic gain control (AGC) circuit 38 is preferably employed. AGC circuit 38 is connected to the output terminal of amplifier 26 to derive a D.C. voltage related in amplitude to the average signal strength applied to the amplifier. The D.C. output voltage of circuit 38 is applied in parallel to amplifiers 26 and 27 to maintain the gain of both amplifiers in their linear operating regions.

To describe system operation, it is assumed that transceiver 11 is activated to transmit message information on carrier $f_1$ and transceiver 12 is adjusted to receive $f_2$. With switches 28, 32, 33 and 34 of transponder 21 in the illustrated positions, the signal level on the $f_1$ carrier is passed through filter 29, increased in wide band amplifier 26 and is then coupled to mixer 37. The output frequencies of balanced modulator 37, ($2f_1$–$f_2$) and $f_2$ are coupled to filter 32. The latter rejects the first frequency and passes the second. The $f_2$ output signal of filter 31, which contains the same information components as the originally received $f_1$ carrier, is supplied to broad band power amplifier 27. The high power $f_2$ signal deriving from amplifier 27 is coupled to port 25 of circulator 23, from which it is fed to transceiver 12.

When the voltage of source 35 is negative, switches 28 and 32–34 are reversed. Thereby, the $f_1$ signal is substantially attenuated by filter 31 prior to being applied to the input terminal of amplifier 26, and the mixer output at $f_2$ is therefore quite small. The $f_2$ component is further attenuated by filter 29. Since mixer 37 is a balanced modulator there is no $f_1$ carrier in its output spectrum that could be passed by filter 29; hence the $f_1$ input is attenuated twice in the transponder. In consequence, there is virtually no energy fed by antenna 22 to transceiver 12 in the interval when switches 28, and 32–34 are in the position opposite to that illustrated. Energy coupled to transceiver 12 from transponder 21 comprises modulated $f_2$ carrier pulses occurring at a frequency in excess of twice the modulator frequency. These pulses are integrated by transceiver 12 to derive a substantial replica at speaker 14 of the voice signal at microphone 13 of transceiver 11.

Frequencies $f_1$ and $f_2$ are sufficiently displaced (e.g. by 2 to 20 megacycles) so that the high power $f_2$ carrier deriving from transponder 21 does not interfere with the relatively weak $f_1$ carrier received by it from transceiver 11; hence oscillations in the transponder are prevented. Mixing $f_2$ with $f_1$ and vice versa through circulator 23 is obviated by designing the circulator and the remainder of the circuit so ports 24 and 25 are isolated from each other by more than the system gain for the passed frequency divided by the filter rejection of the attenuated frequency. Thus, ports 24 and 25 are isolated from each other by more than $$\frac{A_{26} \cdot A_{27} \cdot A_{29f_1} \cdot A_{31f_2}}{A_{29f_2} \cdot A_{31f_1}}$$

where $A_{26}$ and $A_{27}$ represent the gain of amplifiers 26 and 27; $A_{29f_1}$ and $A_{31f_2}$ are the pass band characteristics of filters 29 and 31 for $f_1$ and $f_2$, respectively; and $A_{29f_2}$ and $A_{31f_1}$ are the rejection band characteristics of filters 29 and 31 to $f_2$ and $f_1$, respectively.

When transmission direction is reversed, transceiver 12 derives a modulated, intelligence carrier of frequency $f_2$. The $f_2$ wave is applied by circulator 23 to filter 29 and thence to R.F. amplifier 26. With switches 28 and 32–34 in the illustrated position, the $f_2$ input to amplifier 26 is attenuated greatly by filter 29; hence the $f_1$ amplitude deriving from mixer 37 is virtually zero. Further attenuation of the $f_1$ signal occurs in filter 31 so no $f_1$ energy is transmitted between antenna 22 and the transceiver 11.

When oscillator 35 changes state, causing switches 28 and 32–34 to be altered from the illustrated position, the $f_2$ signal impressed on filter 31 is passed to the input of amplifier 26 where it is amplified and passed to mixer 37 via switches 28 and 33. One of the components generated by mixer 37 has a carrier frequency $f_1$ that contains substantially all of the modulation information on carrier $f_2$. The $f_1$ output signal derived by mixer 37 is coupled through switches 34, 32 and filter 29 to amplifier 27, from where it proceeds to antenna 22 via hybrid 23. Thus, received at transceiver 11 are pulses of $f_1$ carrier modulated substantially the same as the continuous $f_2$ wave deriving from transceiver 12. The $f$ carrier pulses occur with a duty cycle of generally 50% (but may be higher or lower) the switching frequency, so that integration effects of the detector included in transceiver 11 provide a continuous wave at its speaker 14 that is a reasonable replica of the wave applied to microphone 13 of transceiver 12.

Broadly described, then, the repeater 21 continuously receives signals on carrier frequencies $f_1$, $f_2$ from transceivers 11 and 12, via antenna 22. The repeater 21 selects the frequencies $f_1$ and $f_2$ on alternation, converts to frequencies $f_2$ and $f_1$, respectively, and transmits the converted frequencies. Accordingly, frequencies $f_1$, $f_2$ are repeated in alternation and are received on a time division basis by the transceivers, transceiver 11 receiving $f_1$ and transceiver $f_2$.

Figure 2:
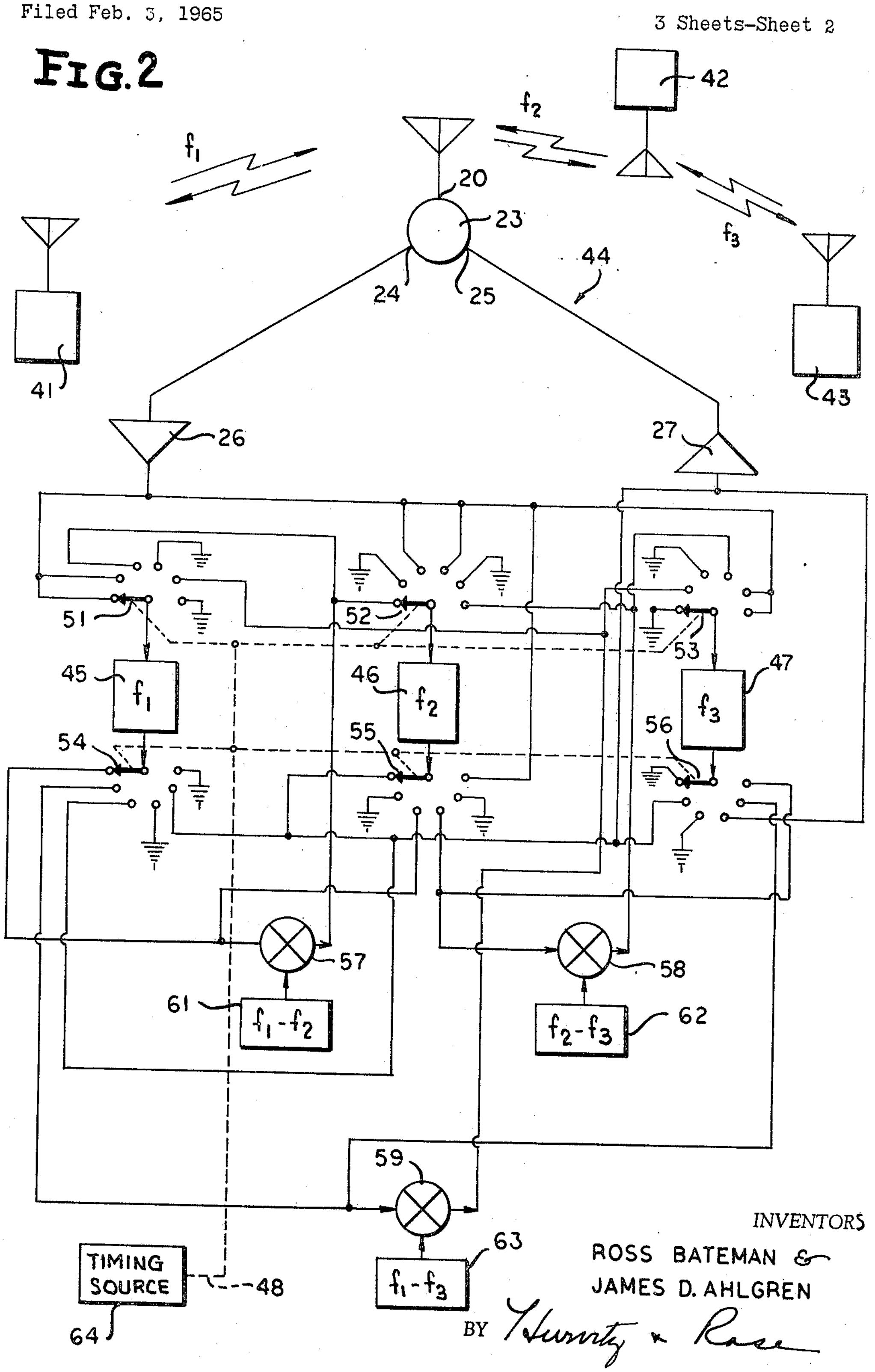
FIGURES 2 and 3 are block diagrams of additional embodiments of the invention wherein transmission occurs between three transceivers via a transponder.

Reference is now made to FIGURE 2 wherein the concepts of FIGURE 1 are expanded so that communication between three transceivers 41, 42 and 43 may be attained. Each of transceivers 41, 42 and 43 is adapted to transmit and receive on the same carrier frequency. The carrier frequency for each of transceivers 41, 42 and 43 is different, being $f_1$, $f_2$ and $f_3$, respectively. One of the transceivers 41–43 is transmitting a message that is coupled by transponder 44 to the others, e.g., transceiver 41 transmits a message on carrier $f_1$ that is relayed, on a time sharing basis, by transponder 44 to transceivers 42 and 43 on carriers $f_2$ and $f_3$, respectively.

Transponder 44 includes three bandpass filters 45, 46 and 47 for respectively passing one of frequencies $f_1$, $f_2$ and $f_3$ to the exclusion of the other two carrier frequencies. Two inputs of each bandpass filter are selectively connected to the output terminal of broadband amplifier 26 via contacts 51–53 of six position switch 48 that includes six ganged armatures 51–56. Respective ones of contacts 51–56 selectively connect the input and output terminals of filters 45–47 with balanced modulators 57–59. Mixers 57–59 are supplied by local oscillators 61–63 with waves of constant frequencies $(f_1-f_2)$, $(f_2-f_3)$ and $(f_1-f_3)$, respectively. The output terminals of filters 45–47 are selectively connected through contacts 54–56 to the input terminal of broad band amplifier 27, the output of which is coupled to antenna 22 via hybrid 23.

Armatures 51–56 are moved together in unison over their contacts by timing source 64 so that a complete cycle of the armatures traversing the six contacts occurs at a frequency of at least $2\Delta f$, where $\Delta f$ is the maximum frequency excursion of the information modulated on each carrier. While switch contacts 51–56 are shown as being of the electromechanical type, for purposes of facile understanding, it is to be understood that they may be synchronous electronic switches.

In operation, source 64 cyclically connects amplifiers 26 and 27 with filters 45–47 and mixers 57–59 via contacts 51–56 so that the following six conversion operations occur in sequence: (1) $f_1$ to $f_2$; (2) $f_1$ to $f_3$; (3) $f_2$ to $f_1$; (4) $f_2$ to $f_3$; (5) $f_3$ to $f_1$; and (6) $f_3$ to $f_2$. When timer 64 is in state one, contacts 15–56 are in the position illustrated; in state two, contacts 51–53 are advanced one position clockwise while contacts 54–56 are advanced one position counterclockwise. For each of the following four states, contacts 51–56 are advanced one position in the same directions as between the first and second positions.

If it is assumed that transceiver 41 is transmitting on frequency $f_1$ while transceivers 42 and 43 are receiving on frequencies $f_2$ and $f_3$, respectively, a pair of communication links is established through transponder 44 as follows. In the first position of contacts 51–56, the $f_1$ output signal of amplifier 26 is passed through filter 45 to mixer 57, where it is converted into a signal that includes an $f_2$ component. The $f_2$ component deriving from mixer 57 is coupled to amplifier 27 via filter 46. Thereby, a time division multiplex link is established between transceivers 41 and 42.

When contacts 51–56 are activated to their second position, a time division multiplex path is established between transceivers 41 and 43. The path is established from amplifier 26 through filter 45 and mixer 56 that derives an $f_3$ component that is passed by filter 47 to amplifier 27.

Under the assumed condition, transmission of $f_1$ by transceiver 41, the last four positions of contacts 15–56 do not result in signal transmission via transponder 44. Virtually complete attenuation in transponder 44 arises because there are always two bandpass filters rejecting the frequencies of interest. This may be seen by considering state three of source 64 wherein the $f_1$ output frequency of amplifier 26 is severely attenuated by filter 46. The low amplitude $f_1$ component deriving from filter 46 is converted into an $f_2$ component by balanced modulator 57 and the $f_2$ component is further attenuated by filter 45 prior to application to amplifier 27. Thus, there is no communication between transmitting transceiver 41 and receiving transceivers 42 and 43 during the third operating sequence. During the fourth step of source 63, the low amplitude $f_1$ signal deriving from filter 46 is converted by mixer 58 into a pair of components having frequencies $(f_1-f_2+f_3)$ and $(f_1+f_2-f_3)$. Both of these components are outside the pass band of filter 47, to which the output of converter 58 is now coupled, so that virtually no radiation is derived from antenna 22 for the fourth state of sequencer 64. In a similar manner, almost complete attenuation results for the other two states of source 64 during transmission from transceiver 41.

Now consider the case when transceiver 42 is transmitting $f_2$ and transceivers 41 and 43 are receiving $f_1$ and $f_3$. Under this condition, signal attenuation by a pair of filters 45–47 causes almost complete signal attenuation for all states of source 64 except the third and fourth. With armatures 51–56 in the third position, the $f_2$ frequency deriving from amplifier 26 is passed through filter 46 to mixer 57, where it is converted to frequency $f_1$. The $f_1$ output signal of mixer 57 is passed by filter 45 to amplifier 27. When source 64 is activated to its fourth position, the $f_2$ signal deriving from filter 46 is fed to modulator 58, where it is converted to frequency $f_3$ which is passed through filter 47 to amplifier 27. Thus, during the third and fourth states of source 64 communication links are established from transceiver 42 to transceivers 41 and 43 via transponder 44.

Next consider when tranceiver 43 is transmitting $f_3$ and transceivers 41 and 42 are receiving carriers $f_1$ and $f_2$. Transmission via transponder 44 occurs only during the last two sequences of sources 64 under this condition. During these states of contacts 51–56, the $f_3$ carrier is passed through filter 47. In the fifth state, the $f_3$ signal is converted to frequency $f_1$ by modulator 59, the $f_1$ output spectrum of which is passed to amplifier 27 via filter 45. With source 64 in the sixth state, the $f_3$ carrier deriving from filter 47 is converted into $f_2$ and $2f_3-f_2$ by mixer 58. The $f_2$ sideband of modulator 58 is passed through filter 46 to amplifier 27 for transmission to transceiver 42.

In the arrangement shown in FIGURE 2 and described above, input amplifier 26 is connected directly to the antenna (via the circulator), rather than through a bandpass filter as in the embodiment illustrated in FIGURE 1. In the embodiment of FIGURE 2, the first bandpass filter is placed between input amplifier 26 and the appropriate mixer, rather than between the antenna and input amplifier. This is done to illustrate that the positions of the amplifier and filter may be reversed, provided adequate isolation is available in the circulator (or whatever device is used to isolate the receiver from the transmitter) to prevent overload of the input amplifier by the transmitter power. In fact, the input amplifier 26 may be eliminated if satisfactory low-noise performance of the balanced mixers is obtained.

Expanding on the concepts presented in FIGURES 1 and 2, it is possible (within practical bounds) to establish a communication link between $n$ transceivers (where $n$ is any integer greater than one), each of which operates on a different carrier. Such a transponder includes $n$ bandpass filters, each having its center frequency coincident with the carrier of a separate carrier. There is a requirement for $$\frac{n(n-1)}{2}$$

balanced modulators, each supplied with a source of local oscillations equal in frequency to the difference frequency of a pair of transceiver carriers. The filters and modulators are connected with each other and amplifiers 26 and 27 via a switch having $n(n-1)$ ganged armatures, each of which selectively engages $n(n-1)$ contacts.

Figure 3:
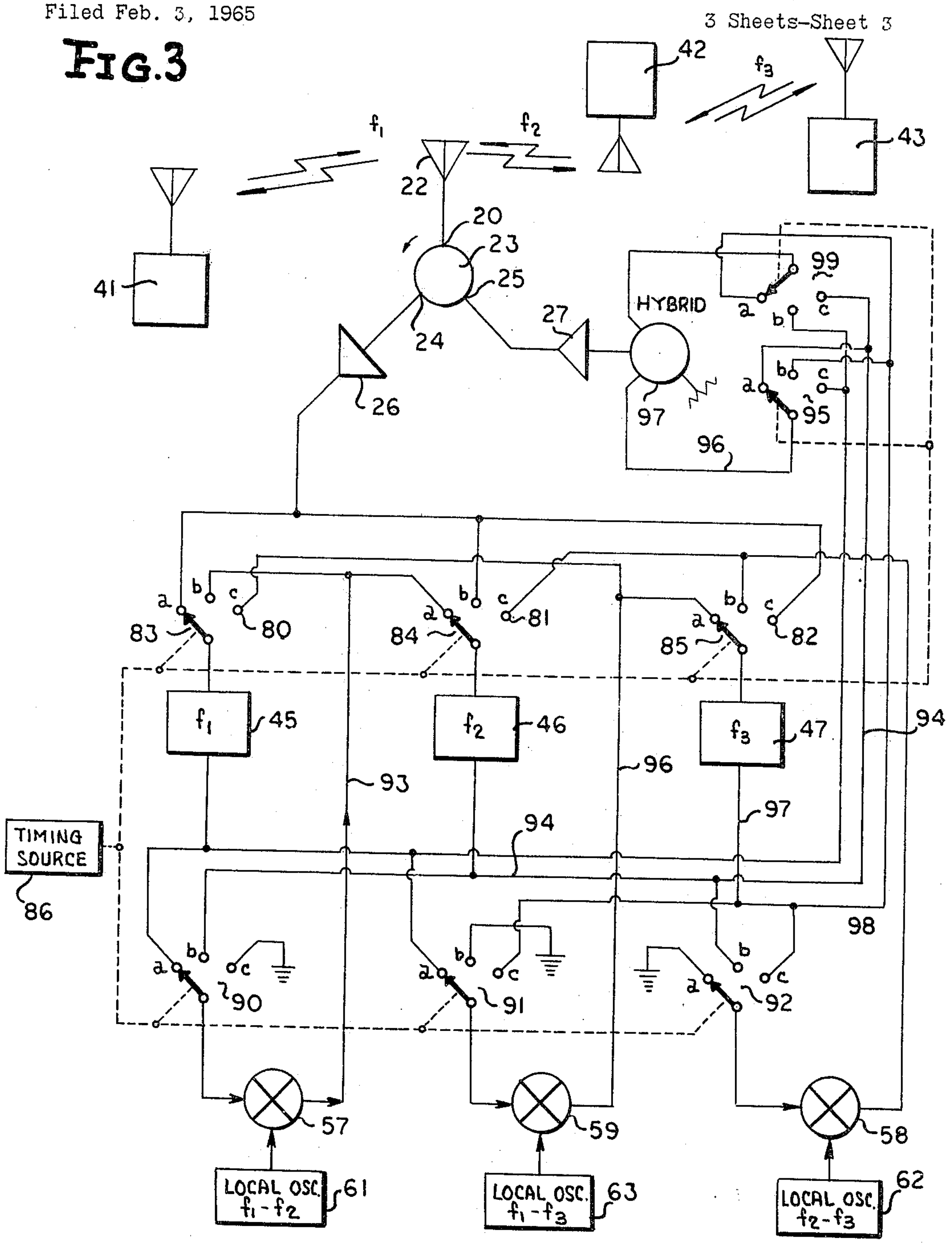

A further modification of the multi-frequency embodiment is shown in FIGURE 3. Here the switching is simplified by permitting simultaneous translation from $f_1$ to $f_2$ and from $f_1$ to $f_3$. This requires that the output amplifier 27 simultaneously pass two or more frequencies, and therefore requires that it operate in a linear mode.

Referring now more particularly to FIGURE 3, the input amplifier 26 supplies signals to the $a$ contact of selector switch 80, to the $b$ contact of selector switch 81 and to the $c$ contact of selector switch 82, which have wiper arms 83, 84 and 85, respectively. The latter are sequentially stepped over contacts $a$, $b$, $c$ of the several switches, in synchronism, by a timing source 86. Thereby, incoming signals are applied in sequence to filters 45, 46, 47, which select the frequencies $f_1$, $f_2$, $f_3$, respectively, which correspond with the carrier frequencies pertaining to transceivers 41, 42, 43.

Assuming wiper arm 83 to be on contact $a$ of switch 80, signal at frequency $f_1$ passes through filter 45 and via the $a$ contact of switch 90 to mixer 51. The latter serves to heterodyne frequency $f_1$ with frequency $f_1-f_2$ supplied by oscillator 61, converting $f_1$ to $f_2$. The latter frequency proceeds via lead 93 and contact $a$ of switch 81, through filter 46, and via lead 94 to contact $a$ of switch 95. The wiper arm of the latter is then at contact $a$, and leads signal to hybrid 97, which in turn transfers the signal at frequency $f_2$ via output amplifier 27 and circulator 23 to antenna 22.

Signal at frequency $f_1$, after selection by filter 45, proceeds to contact $a$ of switch 91, whence it proceeds to mixer 59, and is converted, in response to the signal at frequency $f_1-f_3$ supplied by oscillator 63, to frequency $f_3$. Frequency $f_3$ proceeds via lead 96 to contact $a$ of switch 82, is selected by filter 47, and applied to leads 97, 98, and thence to contact $a$ of switch 99. The latter transfers signal to hybrid 97, output amplifier 27, circulator 23 and antenna 22.

Frequency $f_1$, while the several stepping switches are at contact $a$, is thus converted to frequencies $f_2$ and $f_3$, which are radiated. During this operation mixer 58 is grounded via contact $a$ of switch 92, and is thus inoperative.

On transfer of the several switches to their $b$ contacts, mixer 59 is rendered inoperative and mixers 57 and 58 operative. The latter mixers convert $f_2$, supplied from switch 81 and filter 46, to $f_1$ and $f_3$, respectively. The latter frequencies are then transferred to antenna 22 via switches 99 and 95, respectively, in each case via the appropriate one of filters 45, 47. An analogous pair of conversions and transfers is effected for frequency $f_3$, where contacts $c$ of the several switches are active.

The repeater of the present invention finds further application for use with transceivers employing different frequencies for transmission and reception, as in the system of FIGURE 4, since the repeater need only convert the transmission frequency of each transceiver to the reception frequency of the other. If then, one transmitter has a carrier frequency $f_1$ while its receiver frequency is $f_1+\Delta f$, while the other has its transmitter frequency $f_2$ and its receiver frequency $f_2-\Delta f$, where $\Delta f$ is identical for both transceivers, it is only required that the heterodyne frequency at the transducer by $f_1-f_2+\Delta f$, and if $f_1>f_2$, $f_1$ will convert to $f_2-\Delta f$ by subtraction, and $f_2$ to $f_1+\Delta f$ by addition of heterodyne frequencies. For example, assume $f_1=300.$ mc. and $f_2=320.$ mc. and $\Delta f=3.$ mc., so that the receiver frequencies are 297. and 323. mc., respectively. The heterodyne frequency at the repeater can be 23. mc., whereupon 320. mc. ($f_1$) will convert to 297. mc. ($f_2-\Delta f$) and 300. mc. ($f_2$) to 323. mc. ($f_1+\Delta f$). Since FIGURES 1 and 4 are substantially identical in structure, except for use of an oscillator 36a, which differs in frequency from oscillator 36 by the value $\Delta f$, and the appropriate corresponding frequency modifications.

The repeater of the present invention may also be configured for operation on series paths, in the event it is necessary to span a distance greater than the capability of a single transponder. For example, if it were not possible to cover the range between transceivers 1 and 2 with a single transponder, two transponders might be used, the first translating $f_1$ to $f_3$, and the second receiving $f_3$ and retranslating to $f_2$. In such case synchronization of the transponders is desirable, if not essential to high grade transmission.

By appropriate choice of the bandwith of the bandpass filters, the transponder may be arranged to pass two or more voice transmissions simultaneously. In such a mode it can provide multiple access and, if desired, duplex communications between transceiver pairs. In the multiple access mode the transponder can be operated either on a master-slave arrangement (translating information received on $f_1$ simultaneously to $f_2, f_3 \ldots f_n$ and translating any information received on the slave channels back to $f_1$), or on a multiple private-line basis translating between $f_1$, and $f_2$, between $f_3$ and $f_4 \ldots$ between $f_{n-1}$ and $f_n$.

While we have described and illustrated several specific embodiments of our invention, it will be clear that variations of the details of construction which are specifically illustrated and described may be resorted to without departing from the true spirit and scope of the invention as defined in the appended claims.

We claim:

1. In combination, a first transceiver having a transmission frequency $f_1$ and a reception frequency $f_1+\Delta f$, a second transceiver having a transmission frequency $f_2$ and a reception frequency $f_2-\Delta f$, a repeater responsive to said frequency $f_2$ to retransmit frequency $f_1+\Delta f$, and responsive to frequency $f_1$ to retransmit frequency $f_2-\Delta f$, wherein said repeater includes a single converter including a local oscillator of frequency $f_1-f_2+\Delta f$, where $f_1>f_2$, and wherein is further provided means for alternatively rendering said repeater receptive to frequencies $f_1$ and $f_2$.

2. In combination, a first transceiver having transmission and receiving frequency bands centered on frequency $f_1$, a second transceiver having transmission and receiving frequency bands centered on frequency $f_2$, a repeater for receiving signals lying in said bands, said repeater being responsive to reception of signals in one of said bands to transmit signals in the other of said bands and responsive to reception of signals in said other of said bands to transmit signals in said one of said bands, said repeater including a signal converter including a local oscillator having a frequency equal to $f_1-f_2$, and control means for sequentially and repetitively rendering said repeater receptive to said bands in alternation.

3. The combination according to claim 2 wherein each of said circuits includes an amplifier having a frequency pass band sufficient to amplify signals in both said frequency bands.

4. The combination according to claim 3 comprising means responsive to a signal level derived from an output signal of one of said amplifiers to control the gain of one of said amplifiers.

5. The combination according to claim 3 comprising means responsive to a signal level derived from an output signal of one of said amplifiers to maintain a linear gain of both said amplifiers.

6. The combination according to claim 3 further comprising a common signal circuit connected in both said receiving and transmitting circuits, means for isolating said receiving circuit and said transmitting circuit from one another, said amplifiers associated with said receiving and transmitting circuits having gains of $A_1$ and $A_2$ respectively, said filters having frequency rejection ratios of $R_1$ and $R_2$ for signals centered about frequencies $f_1$ and $f_2$ respectively, the isolation introduced between said transmitting and receiving circuits being at least $$\frac{A_1 \cdot A_2}{R_1 \cdot R_2}$$

7. In combination, a plurality of transceivers equal in number to $n$, and designated transceivers $1 \ldots n$, each transceiver $1 \ldots n$ transmitting on a different frequency of a group of frequencies $f_1 \ldots f_n$, respectively, each transceiver receiving signals at the same frequency at which it transmits signals, a repeater for receiving signals at all of said frequencies, said repeater being responsive to receipt of a signal at any one of said group of frequencies $f_1 \ldots f_n$ to transmit signals at each of the other frequencies of said group, said repeater including a number of signal converters equal to $$\frac{n(n-1)}{2}$$

each of said converters including an oscillator having a frequency $f_x-f_y$ different from the frequency of all other oscillators of said repeater where $f_x$ and $f_y$ designate different frequencies of the group of frequencies $f_1 \ldots f_n$, and control means for rendering the repeater receptive to said frequencies $f_1 \ldots f_n$ sequentially and repetitively.

8. The combination according to claim 7 wherein are provided two repeaters arranged in tandem to span a greater range than is possible with a single repeater, wherein one of said repeaters receives signals in said one of said frequency bands and transmits signals in another frequency band and wherein the other of said repeaters receives signals in said another of said frequency bands and transmits signals in said other of said frequency bands.

9. The combination according to claim 7 wherein are provided a plurality of repeaters arranged in tandem between said transceivers, each said repeater receiving and transmitting a first band of frequencies which corresponds to the transmission and reception frequencies of a transmitter and a receiver located adjacent thereto in a first direction in the transmission path between transceivers and receiving and transmitting a second band of frequencies different from said first band of frequencies and corresponding to the transmission and reception frequencies of a further transmitter and a further receiver located adjacent thereto in a second direction in the transmission path between transceivers.

10. In combination, a first transceiver having transmission and receiving frequency bands centered on frequency $f_1$, a second transceiver having transmission and receiving frequency bands centered on frequency $f_2$, a repeater for receiving signals lying in said bands, said repeater being responsive to reception of signals in one of said bands to transmit signals in the other of said bands and responsive to reception of signals in said other of said bands to transmit signals in said one of said bands, said repeater including a signal converter providing a local oscillator having a frequency equal to $f_1-f_2$, a band pass filter for signals in one of said bands, a band pass filter for signals in the other of said bands, a signal receiving circuit and a signal transmitting circuit, each of said filters being electrically located between said converter and a different one of said circuits, and control means sequentially and repetitively interchanging the electrical locations of said filters in said repeater whereby said repeater is rendered receptive to said frequency bands in alternation.

11. In combination, a first transceiver having transmission and receiving frequency bands centered on frequency $f_1$, a second transceiver having transmission and receiving frequency bands centered on frequency $f_2$ a repeater for receiving signals lying in said bands, said repeater being responsive to reception of signals in one of said bands to transmit signals in the other of said bands and responsive to reception of signals in said other of said bands to transmit signals in said one of said bands, said repeater including a signal converter including a local oscillator having a frequency equal to $f_1-f_2$, and control means for sequentially and repetitively causing said repeater to receive said one of said bands and transmit the other of said bands and to receive the other of said bands and transmit said one of said bands in alternation.

12. The combination according to claim 11 wherein said converter is a balanced mixer.

13. The combination according to claim 12 wherein said balanced modulator has an input circuit and an output circuit, and means for passing signals in one of said frequency bands, means for passing signals in the other of said frequency bands and wherein said control means switches said means for passing between said input and output circuits of said balanced modulator in alternation.

14. In combination, a plurality of transceivers equal in number to $n$, and designated transceivers $1 \ldots n$, each transceiver $1 \ldots n$ transmitting on a different frequency of a group of frequencies $f_1 \ldots n$, respectively, each transceiver receiving signals at the same frequency at which it transmits signals, a repeater for receiving signals at all of said frequencies, said repeater being responsive to receipt of a signal at any one of said group of frequencies $f_1 \ldots f_n$ to transmit signals at each of the other frequencies of said group, said repeater including a number of signal converters equal to $$\frac{n(n-1)}{2}$$

each of said converters including an oscillator having a frequency $f_x - f_y$ different from the frequency of all other oscillators of said repeater where $f_x$ and $f_y$ designate different frequencies of the group of frequencies $f_1 \ldots f_n$, and control means for rendering the repeater receptive to said frequencies $f_1 \ldots f_n$ sequentially and repetitively, wherein $n$ is equal to at least 3.

15. The combination according to claim 14 wherein said repeater transmits signals at each of the other frequencies in sequence.

16. The combination according to claim 14 wherein said repeater transmits signals at each of the other frequencies simultaneously.

References Cited

UNITED STATES PATENTS

| | | | |
|---|---|---|---|
| 1,433,599 | 10/1922 | Brown | 343—178 |
| 2,000,130 | 5/1935 | Espenschied et al. | 325—1 |
| 2,666,845 | 1/1954 | Colton et al. | 343—204 X |
| 3,076,190 | 1/1963 | Shames et al. | 343—6.8 X |
| 1,507,889 | 9/1924 | Nicholson | 179—170 |
| 1,669,123 | 5/1928 | Espenschied et al. | 325—5 X |
| 2,530,748 | 11/1950 | Winchel | 325—5 |

OTHER REFERENCES

RCA Technical Note Tn. No. 120, March 1958.

ROBERT L. GRIFFIN, Primary Examiner

BENEDICT V. SAFOUREK, Assistant Examiner

U.S. Cl. X.R.

325—9, 11, 15; 343—175, 178